UNITED STATES PATENT OFFICE.

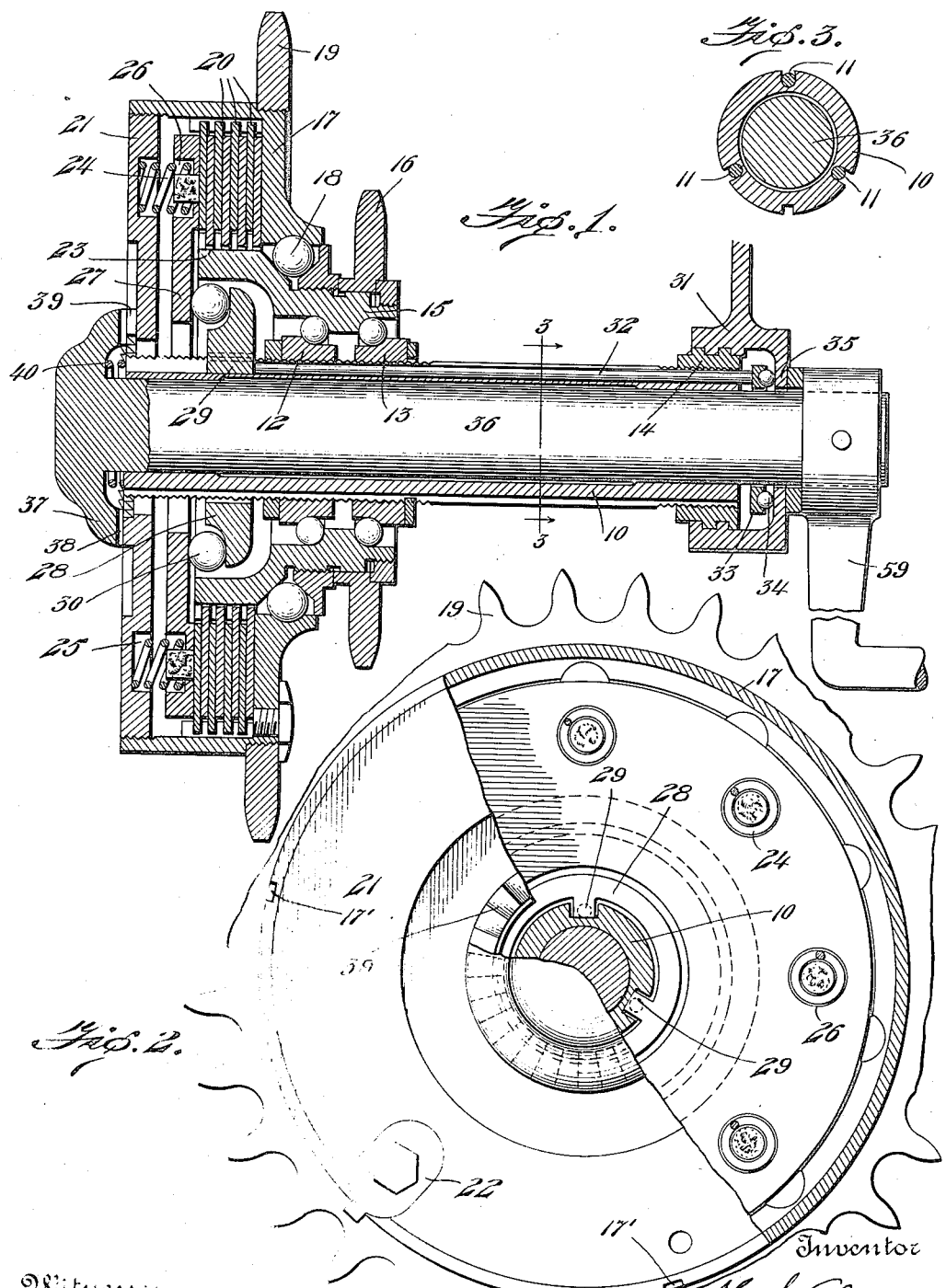

FREDERICK S. ELLETT, OF ELMIRA, NEW YORK.

MOTOR-CYCLE.

1,215,783. Specification of Letters Patent. Patented Feb. 13, 1917.

Application filed October 25, 1913. Serial No. 797,234.

*To all whom it may concern:*

Be it known that I, FREDERICK S. ELLETT, a citizen of the United States, and resident of Elmira, Chemung county, State of New York, have invented certain new and useful Improvements in Motor-Cycles, of which the following is a specification.

This invention relates to motor-cycles and more particularly to the improved means for starting the engine.

It has been heretofore the custom to start the motor cycle engine either by running the machine for a short distance along the ground so that the engine will be driven by the rear wheel of the motor-cycle or in cases where the motor cycle is provided with a "free engine clutch," the rear wheel has been supported off the ground and rotated by the pedals to start the engine. Motor-cycles are now being manufactured which are not provided with pedals and in such machines it is desirable to have some form of starting crank. It is also desirable to have a free engine clutch so as to permit the engine to run while the machine is standing still, and it is the object of the present invention to provide a comparatively simple and compact construction which will embody a free engine clutch and a starting crank whereby the machine may be started while standing and without lifting the rear wheel off the ground.

Other objects and the features of novelty will be apparent from the following description taken in connection with the accompanying drawings, in which, Figure 1 is a section through a clutch and starting mechanism embodying my invention;

Fig. 2 is an end view thereof with parts broken away and shown in section;

Fig. 3 is a section on the line 3—3 of Fig. 1.

Referring to the drawings, 10 indicates a tubular shaft which is non-rotatably supported in the motor cycle frame and which is provided with longitudinally extending grooves 11 in its outer surface and has its ends threaded to receive the ball bearing rings 12 and 13 and the threaded ring 14. The bearing rings 12 and 13 support a sleeve 15 to which is secured a driving wheel or sprocket 16. A shell or casing 17 is rotatably supported on a ball bearing 18 on the sleeve 15 and has secured thereto a driven wheel or sprocket 19. The shell 17 carries on its interior a plurality of friction disks 20 and has its outer side closed by means of an annular plate 21 which has a threaded connection therewith. The shell 17 has grooves 17' in its outer surface which are adapted to be engaged by fastenings 22 secured to the plate 21, these fastenings preventing the plate 21 from turning.

The shaft 10 constitutes a counter shaft and the sprocket 19 is driven from the engine shaft by means of the usual driving chain. A driving chain extends from the sprocket 16 to a sprocket on the rear wheel of the motor cycle and in order to couple the sprockets 16 and 19 so as to form a driving connection between the engine and the rear wheel, the sleeve 15 carries friction disks 23 which are arranged between the disks 20. The disks 20 and 23 are normally held in gripping engagement by means of springs 24 which have one end arranged in pockets 25, on the inner side of the plate 21, and the other end arranged in pockets 26 in a ring 27 which engages the outermost disk 20.

When it is desired to uncouple the sprocket wheels 16 and 19 the ring 27 is moved toward the plate 21, thereby compressing the springs 24, and for this purpose I have provided a ring 28 which is slidable on the shaft 10 and is provided with inwardly extending lugs 29 which are arranged in suitable slots in the outer surface of the shaft 10 and in alinement with the grooves or channels 11. A ball bearing 30 is arranged between the rings 27 and 28, as shown in Fig. 1, so as to permit the ring 27 to rotate freely with the sprocket 19.

At the opposite end of the shaft 10 is arranged an actuating nut 31, for the clutch, this nut engaging the threaded ring 14. Arranged in the channels 11 are rods 32 which have one end in engagement with the lugs 29 and the other end in engagement with the ring 33 of a ball thrust bearing 34, the nut 31 having an inwardly directed flange 35 which is engaged by the balls 34.

By rotating the nut 31 the ring 28 may be moved to actuate the plate 27 for the purpose of coupling and uncoupling the sprockets.

Arranged in the shaft 10 is a shaft 36 which has at one end a head 37 having jaws or ratchet teeth 38 which are adapted to coöperate with teeth 39 on the exterior of the plate 21 for the purpose of forming a driving connection between the shaft 36 and the plate. At is opposite end the shaft 36 has a manually operable crank 59. A spring 40 is arranged on the inner side of the head 37 and between the latter and the end of the shaft 10 and normally presses the shaft 36 endwise so as to automatically disengage the teeth 38 and 39.

The shaft 36 constitutes a starting shaft for the motor cycle and with the sprockets 16 and 19 uncoupled it will be seen that the engine may be readily started by moving the shaft 36 so as to engage the teeth 38 and 39 and then rotating the shaft 36, the engine shaft being rotated by the chain which connects the engine sprocket with the sprocket 19. As soon as the engine starts the teeth 38 and 39 become automatically disengaged and the engine will continue to run. The power may be then transmitted to the rear wheel to move the motor cycle by coupling the sprockets 16 and 19 by means of the clutch disks and the power transmitted to the rear wheel may be controlled by varying the pressure which the springs 24 exert on the disks, by means of the nut 31.

From the foregoing description it will be understood that by my improvements it is possible to start the engine without raising the rear wheel from the ground and it is not necessary to have pedals for starting purposes. It will also be seen that by arranging the shaft 36 within the tubular shaft 10 a very compact construction is provided.

Having described my invention what I claim and desire to secure by Letters-Patent is, 1. In a motor-cycle, the combination of a tubular shaft, independently rotatable driving and driven wheels, means adapted to form a driving connection between said wheels, a rotatable shaft arranged in said tubular shaft, a crank on said rotatable shaft at one end of the tubular shaft, and clutch means at the other end of the tubular shaft for operatively connecting the rotatable shaft to one of said wheels.

2. In a motor-cycle, the combination of a shaft, independently rotatable driving and driven sprocket wheels carried thereby, a friction clutch for coupling said wheels, a manually operable shaft, and clutch means for operatively connecting the latter shaft and one of said wheels.

3. In a motor-cycle, the combination of a tubular shaft, independently rotatable driving and driven wheels carried thereby, a friction clutch for coupling said wheels, a manually operable shaft arranged in said tubular shaft, and clutch means for opera- tively connecting the latter shaft with one of said wheels.

4. In a motor-cycle, the combination of a shaft, independently rotatable driving and driven wheels carried thereby, clutch means for coupling said wheels, a manually operable crank shaft coaxial with the first-mentioned shaft, and automatically uncoupling clutch means for coupling said crank shaft and one of said wheels.

5. In a motor-cycle, the combination of a shaft having a plurality of channels extending longitudinally thereof, independently rotatable driving and driven wheels carried thereby at one end, clutch means for coupling said wheels, an actuating member for the clutch means arranged at the opposite end of said shaft from said wheels, and rods arranged in said channels and operatively connecting said member with the clutch means.

6. In a motor-cycle, the combination of a shaft having a plurality of longitudinal channels in the outer surface thereof, independently rotatable driving and driven wheels carried by said shaft at one end thereof, clutch means for coupling said wheels, an actuating nut on the opposite end of said shaft, and rods arranged in said channels and operatively connecting said nut and the clutch means.

7. In a motor-cycle, the combination of a shaft having a plurality of longitudinally extending channels therein, independently rotatable driving and driven wheels carried by said shaft on one end thereof, clutch means for coupling said wheels, a member adapted to be manually rotated, an automatically uncoupling clutch for connecting said member and one of said wheels, a nut for actuating said clutch means arranged at the opposite end of said shaft from the clutch means, and rods arranged in said channels and operatively connecting said nut with the clutch means.

8. In a motor-cycle, the combination of a tubular shaft having a plurality of longitudinally extending channels therein, independently rotatable driving and driven wheels carried by said shaft on one end thereof, clutch means for coupling said wheels, a manually operable shaft arranged in said tubular shaft, a clutch for connecting said manually operable shaft and one of said wheels, a nut for actuating said clutch means arranged at the opposite end of said shaft from the clutch means, and rods arranged in said channels and operatively connecting said nut with the clutch means.

9. In a motor-cycle, the combination of a shaft having longitudinally extending channels in the outer surface thereof, bearing rings adjustably arranged on said shaft near one end thereof, driving and driven wheels supported on said rings, clutch means for coupling said wheels, an externally threaded ring arranged on the opposite end of said shaft, a nut on said ring, and rods arranged in said channels and within said rings and operatively connecting said nut with the clutch means.

In testimony whereof I affix my signature in presence of two witnesses.

FREDERICK S. ELLETT.

Witnesses:
D. HELEN CAUFIELD,
J. COSTELLO.